(No Model.) 2 Sheets—Sheet 2.
J. M. FLOWER.
STALK AND WEED CHOPPER.
No. 557,372. Patented Mar. 31, 1896.
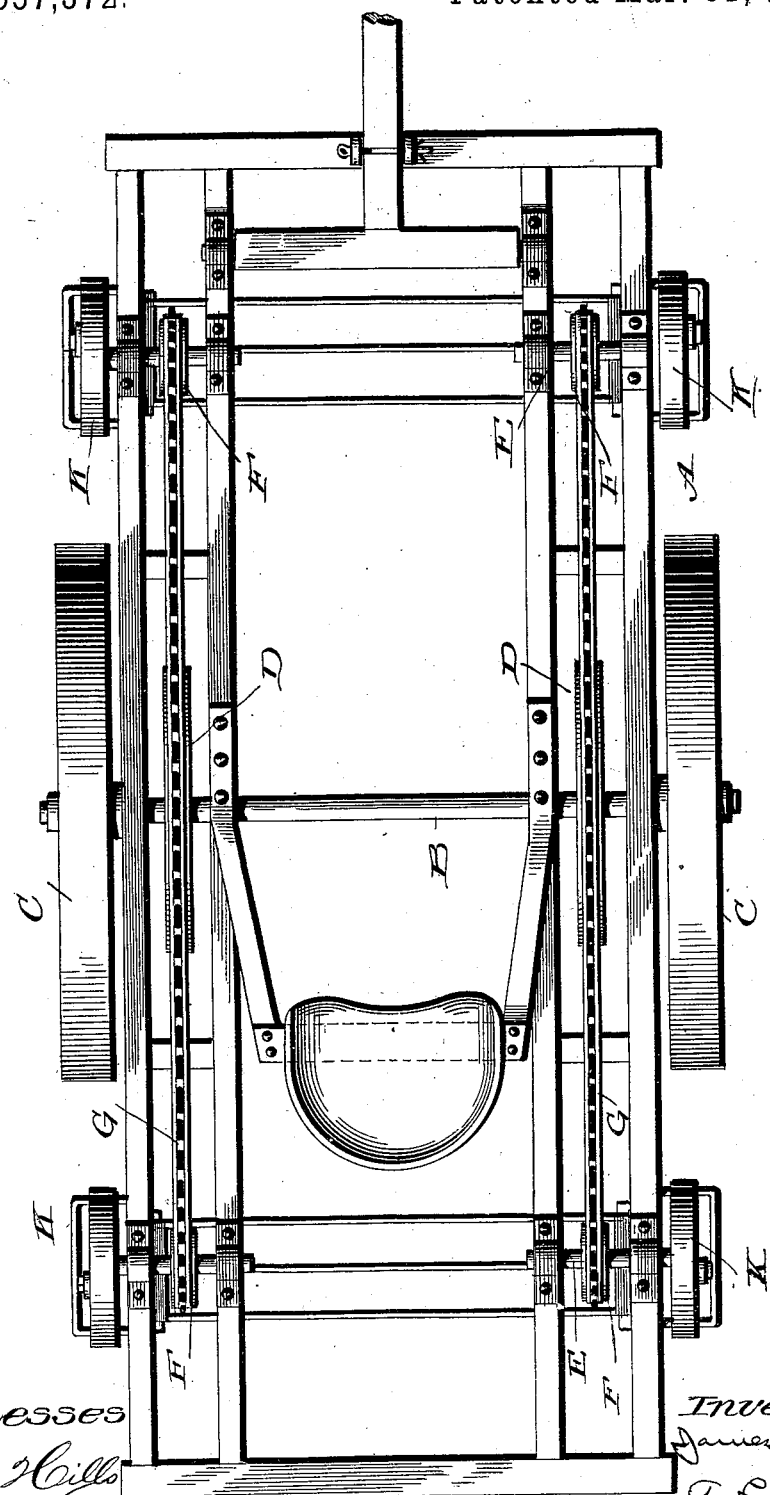
Witnesses
L. C. Hills
W. S. Van Loan
Inventor:
James M. Flower
by A. P. Hough
Atty.

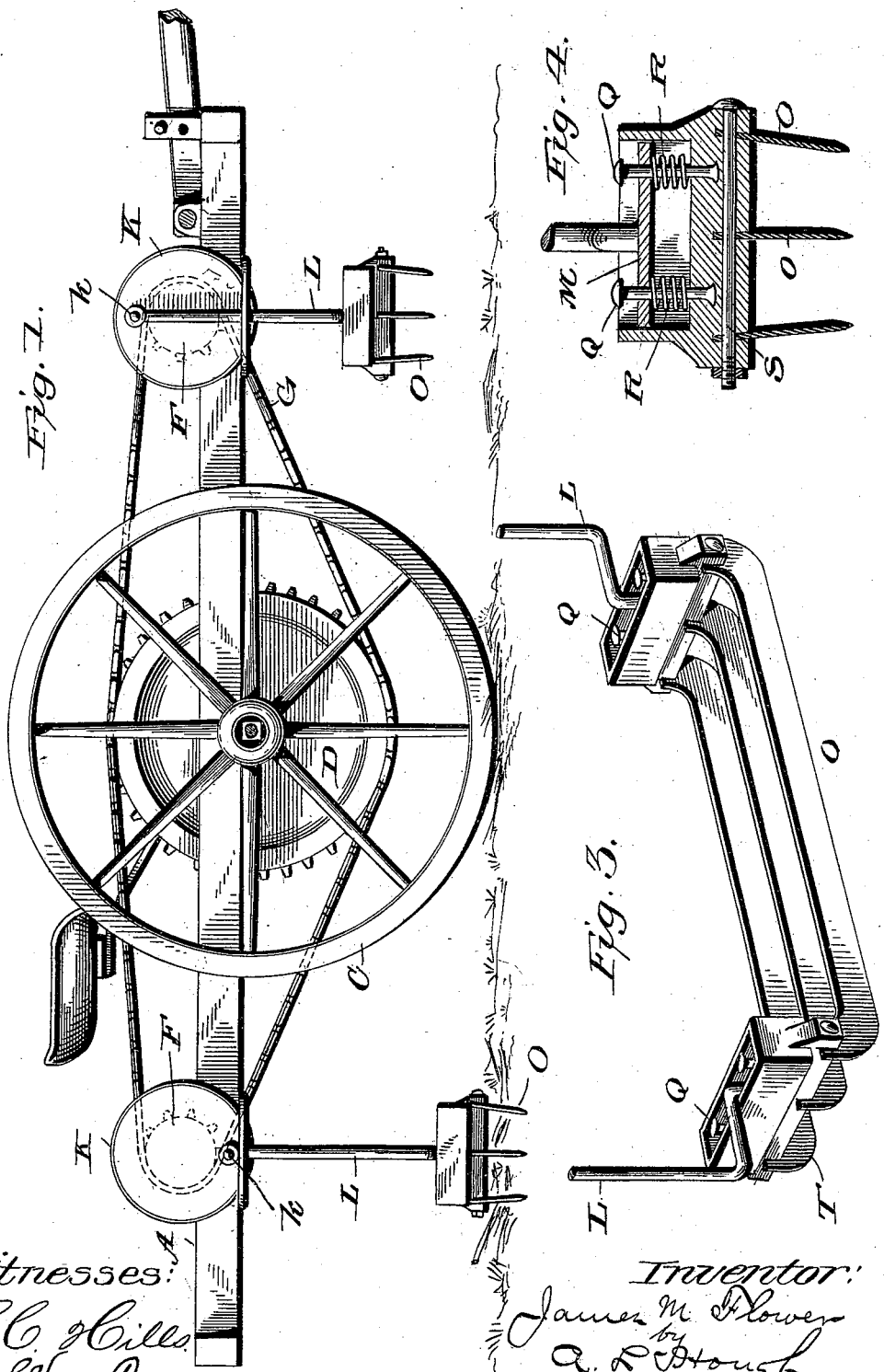

UNITED STATES PATENT OFFICE.

JAMES M. FLOWER, OF POTTS STATION, ARKANSAS.

STALK AND WEED CHOPPER.

SPECIFICATION forming part of Letters Patent No. 557,372, dated March 31, 1896.

Application filed October 14, 1895. Serial No. 565,574. (No model.)

*To all whom it may concern:*

Be it known that I, JAMES M. FLOWER, a citizen of the United States, residing at Potts Station, in the county of Pope and State of Arkansas, have invented certain new and useful Improvements in Stalk and Weed Choppers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in machines for chopping up stalks, weeds, &c.; and the especial object of the invention is to produce a truck which carries knives which are caused to be operated through geared mechanism from the main driving-wheels.

The invention consists, further, in securing to the main driving-axle sprocket-wheels which communicate power to small sprocket-wheels keyed to stub-shafts which cause pitmen to reciprocate, carrying a series of knives adapted to chop up the stalks or weeds as the machine passes over a field. Two series of choppers are provided, one at each end of the truck, and are so arranged that they will operate alternately.

A further object of the invention resides in the construction of the chopping mechanism whereby unnecessary jarring to the machine is prevented while in operation, and the knives are caused to rebound from the ground after the stalks are cut at each revolution of a pitman-carrying wheel.

To these ends and to such others as the invention may pertain the same consists, further, in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which—

Figure 1 is a side elevation. Fig. 2 is a top plan view. Fig. 3 is an enlarged detail view of the knives. Fig. 4 is a cross-sectional view through the cutting-knives, the follower, and shoe.

Reference now being had to the details of the drawings by letter, A designates a truck of a vehicle, which is mounted on an axle B secured thereto, the said axle having journaled at each of its ends a driving-wheel C. D are sprocket-wheels keyed to turn with the said wheel C.

Journaled in suitable boxes near each end of the truck-frame are the stub-shafts E, and near the middle of each shaft is keyed a sprocket-wheel F, and G is a sprocket-chain, there being one on each side of the machine, and each passing over a main sprocket-wheel of the axle-shaft and corresponding sprocket-wheels on the said stub-shafts. To the outer end of each stub-shaft is keyed a pitman-wheel K carrying a wrist-pin $k$, and to each pin is journaled an end of a pitman L. Each pitman carries a follower M at its lower end, and N are shoes carrying a series of cutting-knives O. The outer knives are slanted slightly inward to prevent any clogging of the pieces of stalks after being cut. Q are bolts having their lower ends set in the body portion of each shoe and the upper free ends of each bolt are vertically disposed in the hollow casing of the shoes. The followers are perforated and are adapted to work up and down on the said bolts, and interposed between the lower face of each follower and the upper face of each shoe are the springs R, coiled about the bolts. These springs serve to break the force of the stroke of the pitman and follower as the latter comes in contact with the shoe, and also assist to force the follower from the knives after the stroke is imparted.

It will be observed that when one shoe carrying a set of knives is in contact with the ground the other set is raised to its highest throw, so that but one set are cutting at the same time.

The series of knives are held in place by means of the bolts S, which pass through perforations in the said knives, by which construction the edges may be easily and quickly sharpened by removing the blades. The outer ends of the said knives are rounded, as at T, and slightly bent upward, so as to prevent the knife-carrying shoe coming in contact with the ground at the downward throw of the pitman.

From the foregoing it will be seen that a field covered with stubble or stalks or weeds may be traversed in a short time and the stubble cut into short pieces, suitable to be plowed under the soil, by the alternate strokes of the knives.

Having thus described my invention, what I claim to be new, and desire to secure by Letters Patent, is—

1. In a stalk-chopper the combination with the shoe carrying cutting-knives, a recess in said shoe, follower working therein, pitman connected to said follower, of the bolts Q having their lower heads seated in the said shoe, their shank portions passed through apertures in the follower, and the spring interposed between the lower face of the follower and the bottom of the said recess of the shoe, and means for operating the pitman, all substantially as shown and described.

2. In combination with a shoe of a stalk-chopper, as described, the knives O, having upturned rounded ends, the bolt S holding the said knives to said shoe, the outer knives being inwardly inclined, substantially as shown and for the purpose set forth.

In testimony whereof I affix my signature in presence of two witnesses.

JAMES M. FLOWER.

Witnesses:
G. S. FALLS,
G. T. BROWN.